(12) United States Patent
Cantlon et al.

(10) Patent No.: US 9,441,443 B2
(45) Date of Patent: Sep. 13, 2016

(54) COMPOUND BLOWOUT PREVENTER SEAL AND METHOD OF USING SAME

(71) Applicant: National Oilwell Varco, L.P., Houston, TX (US)

(72) Inventors: Kyle Brett Cantlon, Houston, TX (US); Joseph James Liotta, Conroe, TX (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 14/606,985

(22) Filed: Jan. 27, 2015

(65) Prior Publication Data

US 2016/0215583 A1    Jul. 28, 2016

(51) Int. Cl.
| | |
|---|---|
| *E21B 33/06* | (2006.01) |
| *E21B 33/064* | (2006.01) |
| *F16K 3/02* | (2006.01) |
| *F16K 27/04* | (2006.01) |

(52) U.S. Cl.
CPC ........... *E21B 33/062* (2013.01); *E21B 33/064* (2013.01); *F16K 3/029* (2013.01); *F16K 3/0227* (2013.01); *F16K 27/044* (2013.01)

(58) Field of Classification Search
CPC ..... E21B 33/06; E21B 33/061; E21B 33/064
See application file for complete search history.

(56) References Cited

U.S. PATENT DOCUMENTS

| | | | |
|---|---|---|---|
| 2,527,068 A | 10/1950 | Murray | |
| 4,229,012 A | 10/1980 | Williams, III | |
| 5,603,481 A | 2/1997 | Parker et al. | |
| 5,803,170 A * | 9/1998 | Garcia-Soule | E21B 17/1035 166/241.6 |
| 6,089,526 A * | 7/2000 | Olson | E21B 33/062 251/1.1 |
| 6,367,804 B1 * | 4/2002 | Watts | E21B 33/062 251/1.2 |
| 6,955,357 B2 * | 10/2005 | Griffin | E21B 33/062 251/1.2 |
| 7,367,396 B2 | 5/2008 | Springett et al. | |
| 7,814,979 B2 | 10/2010 | Springett et al. | |
| 2008/0135791 A1 * | 6/2008 | Juda | E21B 33/062 251/1.3 |
| 2010/0243926 A1 | 9/2010 | Weir | |
| 2010/0294482 A1 * | 11/2010 | Araujo | E21B 33/061 166/85.4 |
| 2011/0000670 A1 | 1/2011 | Springett et al. | |
| 2011/0226475 A1 | 9/2011 | Springett et al. | |

(Continued)

FOREIGN PATENT DOCUMENTS

EP          0103786      3/1984

OTHER PUBLICATIONS

PCT/US2016/013801 International Search Report and Written Opinion dated May 4, 2016, 14 pages.

*Primary Examiner* — Matthew R Buck
*Assistant Examiner* — Aaron Lembo
(74) *Attorney, Agent, or Firm* — JL Salazar Law Firm

(57) ABSTRACT

The disclosure relates to a seal assembly for a ram of a blowout preventer for sealing a wellbore penetrating a subterranean formation. The wellbore has a tubular to pass fluid therefrom. The rams are positionable about the tubular. The seal assembly includes a compound seal carried by the ram. The compound seal includes a face seal having a sealing surface sealingly engageable about the tubular and a support seal positionable adjacent to the face seal a distance from the sealing surface. The sealing surface extends along a front face thereof engageable with at least one of the tubular and the face seal of another ram. The support seal is non-engageable with the tubular during sealing and is more deformable than the face seal whereby the compound seal is supported during sealing.

27 Claims, 15 Drawing Sheets

(56) References Cited

U.S. PATENT DOCUMENTS

| | | | |
|---|---|---|---|
| 2012/0000646 A1* | 1/2012 | Liotta | E21B 33/062 166/85.4 |
| 2012/0227987 A1 | 9/2012 | Castriotta et al. | |
| 2013/0118757 A1* | 5/2013 | Barrilleaux | E21B 17/1035 166/373 |
| 2013/0207326 A1* | 8/2013 | Cotter | F16F 9/48 267/119 |
| 2014/0183382 A1* | 7/2014 | Carbaugh | B29C 70/68 251/1.1 |
| 2014/0311735 A1* | 10/2014 | Landrith, II | E21B 33/064 166/250.04 |
| 2015/0068758 A1* | 3/2015 | Leuchtenberg | E21B 21/08 166/336 |
| 2015/0152704 A1* | 6/2015 | Tunget | E21B 33/128 166/254.2 |
| 2015/0275609 A1* | 10/2015 | Liotta | E21B 33/06 166/379 |

\* cited by examiner

COMPOUND BLOWOUT PREVENTER SEAL AND METHOD OF USING SAME

BACKGROUND

The present disclosure relates generally to techniques for performing wellsite operations. More specifically, the present disclosure relates to techniques for preventing blowouts, such as blowout preventers and/or seals.

Oilfield operations may be performed to locate and gather valuable downhole fluids. Oil rigs are positioned at wellsites, and downhole tools, such as drilling tools, are deployed into the ground to reach subsurface reservoirs. Once the downhole tools form a wellbore to reach a desired reservoir, casings may be cemented into place within the wellbore, and the wellbore completed to initiate production of fluids from the reservoir. Downhole tubular devices, such as pipes, certain downhole tools, casings, drill pipe, liner, coiled tubing, production tubing, wireline, slickline, or other tubular members positioned in the wellbore, and associated components, such as drill collars, tool joints, drill bits, logging tools, packers, and the like, (referred to as 'tubulars' or 'tubular strings') may be positioned in the wellbore to enable the passage of subsurface fluids to the surface.

Leakage of subsurface fluids may pose an environmental threat if released from the wellbore. Equipment, such as blow out preventers (BOPs), may be positioned about the wellbore to form a seal about a tubular therein to prevent leakage of fluid as it is brought to the surface. BOPs may be annular or ram BOPs with mechanism, such as rams or fingers, with seals to seal a tubular in a wellbore. Examples of BOPs are provided in U.S. Patent/Application Nos. 2012/0227987; 2011/0226475; 2011/0000670; 2010/0243926; U.S. Pat. Nos. 7,814,979; and 7,367,396, the entire contents of which are hereby incorporated by reference herein.

SUMMARY

In at least one aspect, the disclosure relates to a seal assembly for a ram of a blowout preventer for sealing a wellbore penetrating a subterranean formation. The wellbore has a tubular to pass fluid therefrom. The ram is positionable about the tubular. The seal assembly includes a compound seal carried by the ram. The compound seal includes a face seal having a sealing surface sealing engageable about the tubular, and a support seal positionable adjacent to the face seal a distance from the sealing surface. The sealing surface extending along a front face thereof engageable with at least one of the tubular and the face seal of another ram. The support seal is non-engageable with the tubular during sealing, and is more deformable than the face seal whereby the compound seal is supported during sealing.

The seal assembly may also include an array of inserts with the face seal molded thereabout. The face seal may have a lip extending between upper and lower portions of the array of inserts. The seal assembly may also include supports on opposite sides of the array. The face seal may have contact regions about the supports. The contact regions may define a flat face along the sealing surface. The face seal may have a support surface away from the sealing surface. The support seal is positionable along the support surface. Both the face seal and the support seal each may have a pair of linear portions with an arcuate portion therebetween.

The face seal and support seal each comprise a deformable material.

In another aspect, the disclosure relates to a blowout preventer for sealing a wellbore penetrating a subterranean formation. The wellbore has a tubular to pass fluid from the wellbore. The blowout preventer includes a housing positionable about the wellbore, rams positionable about the passage, and a seal assembly carried by each of the rams. The housing has a passage to receive the tubular therethrough. The seal assembly includes a compound seal. The compound seal includes a face seal having a sealing surface sealing engageable about the tubular, and a support seal positionable adjacent to the face seal a distance from the sealing surface. The sealing surface extending along a front face thereof engageable with at least one of the tubular and the face seal of another ram. The support seal is non-engageable with the tubular and is more deformable than the face seal whereby the compound seal is supported during sealing.

The blowout preventer may also include a housing seal carried by the ram. Each of the rams may have a sealing face. The sealing surface of the seal assembly may be positioned about the sealing face. Each ram may have a seal cavity therein, and the seal assembly may be receivable in the seal cavity. Each ram may have a seal cavity extending into a sealing face thereof, and the seal assembly may be receivable in the seal cavity such that the sealing surface is positioned about the sealing face. Each of the rams may have at least one keys and at least one keyway about a sealing face thereof. The keys and keyways may be interlockingly engageable with a corresponding at least one key and at least one keyway of an adjacent ram. The blowout preventer may also include an actuator to selectively extend and retract the rams.

Finally, in another aspect, the disclosure relates to a method of sealing a wellbore penetrating a subterranean formation. The wellbore has a tubular to pass fluid from the wellbore. The method involves positioning a blowout preventer about the wellbore with the tubing through a passage of the blowout preventer, converging rams of the blowout preventer about the tubular, and sealingly engaging compound seals of the rams by sealingly engaging a sealing surface of a face seal of each of the compound seals about the tubular while supporting the face seal with a support seal, the sealing surface extending along a front face thereof engageable with at least one of the tubular and the face seal of another ram, the support seal positioned adjacent to the face seal a distance from the sealing surface such that the support seal is non-engageable with the tubular during the sealingly engaging, the support seal being more deformable than the face seal.

The may also include supporting an array of inserts with the face seal. The sealingly engaging may involve advancing an array of inserts towards the tubular with the face seal, flowing material of the compound seal towards the tubular, flowing contact regions of the compound seal towards an arcuate region of the compound seal between the contact regions, flowing material of the arcuate region of the compound seal towards the inserts, and/or flowing material of the compound seal towards along the sealing surface. The converging may involve advancing the rams towards the tubular. The sealingly engaging may involve deforming the compound seal with the rams, deforming the face seal against the tubular and deforming the face seal with the support seal, and/or deforming the face seal against the face seal of another ram.

BRIEF DESCRIPTION OF THE DRAWINGS

A more particular description of the disclosure, briefly summarized above, may be had by reference to the embodiments thereof that are illustrated in the appended drawings. It is to be noted, however, that the appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

DETAILED DESCRIPTION OF THE INVENTION

The description that follows includes exemplary apparatus, methods, techniques, and/or instruction sequences that embody techniques of the present subject matter. However, it is understood that the described embodiments may be practiced without these specific details.

Blowout preventers (BOPS) may be positioned about a wellsite and provided with rams having BOP seal assemblies. The BOP seal assemblies have compound BOP seals to form a seal about the wellbore, for example, during a blowout. The compound BOP seal may include multiple seals, such as a face seal and a support seal to selectively engage during sealing. The face seal may have a sealing surface for contact with another ram and/or a wellbore tubular to form a seal therewith. The support seal may support the face seal as the ram block is advanced and the face seal is deformed during sealing.

The face seal and the support seal may be made of an elastomeric or other deformable (non-rigid) material (e.g., rubber). The face seal may be made of a harder (e.g., stronger, stiffer, more rigid, and less deformable) material than the support seal, and/or be made of a different material. The material of the face seal may be the same as or different from the support seal, with the face seal being less deformable than the support seal. The material may be of any material and of any compressibility (deformability) such that the support seal is more deformable than the face seal. By way of non-limiting example, the support seal may have compressibility that is about 1% or more greater (e.g., from about 10 to about 20%) than the face seal.

The compound BOP seal may be configured to flow during sealing and/or to balance movement of the BOP seal assembly (e.g., inserts) with strength needed to maintain seal under wellbore pressures. The selected configuration may be provided to achieve desired strength to perform at any temperature, to bridge minor extrusion gaps between portions of the BOP seal assembly (e.g., inserts), to provide flexibility to seal over a wide sealing range, to resist wear, etc.

Figure 1:
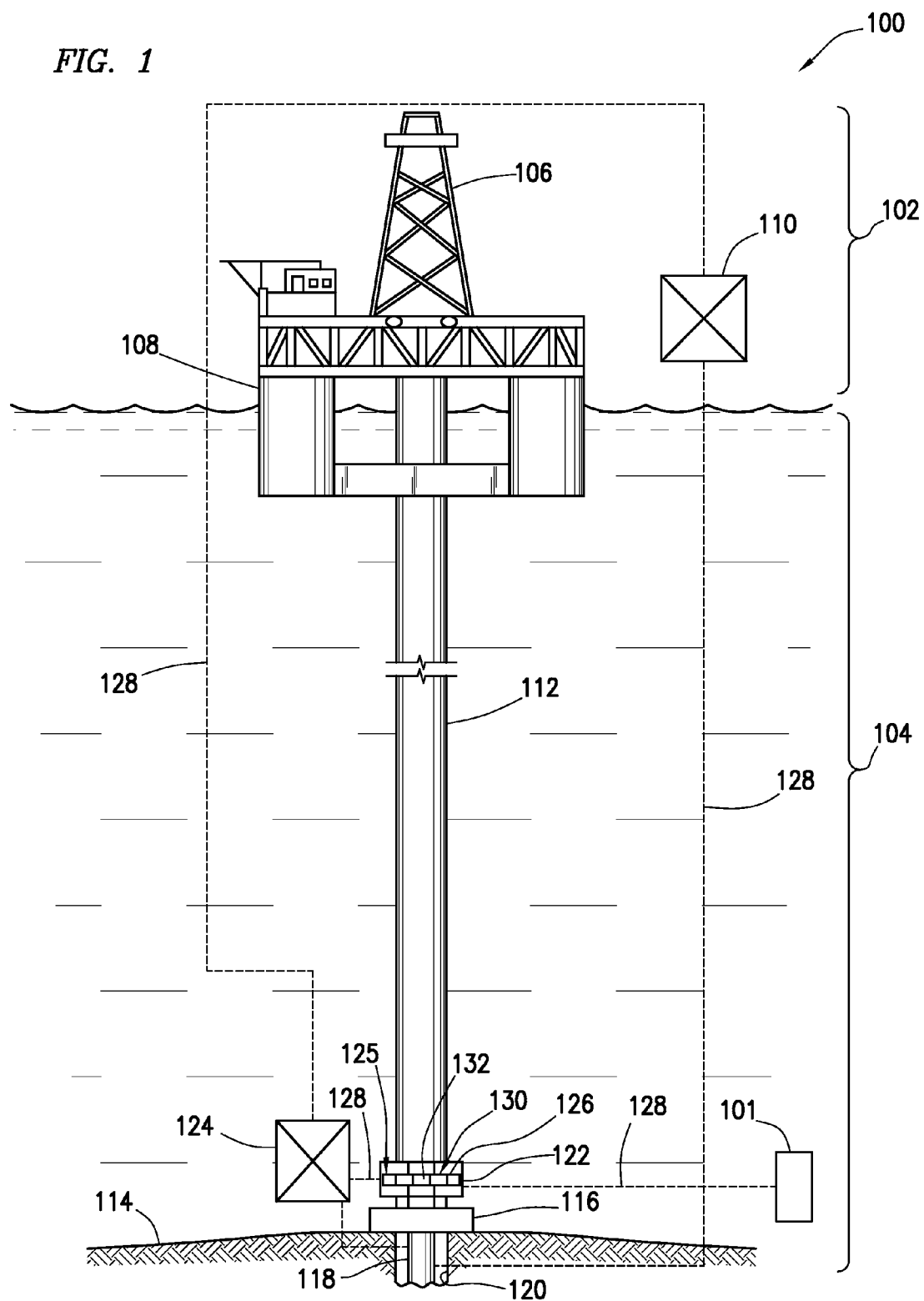
FIG. 1 depicts a schematic view of an offshore wellsite having a blowout preventer (BOP) with rams and BOP seal assemblies having compound BOP seals.

FIG. 1 depicts an offshore wellsite 100 including a surface system 102 and a subsea system 104. The surface system 102 may include a rig 106, a platform 108 (or vessel), and a surface unit 110. The surface unit 110 may include one or more units, tools, controllers, processors, databases, etc., located at the platform 108, on a separate vessel, and/or near to or remote from the wellsite 100. While an offshore wellsite is depicted, the wellsite may be land based.

The subsea system 104 includes a conduit 112 extending from the platform 108 to a sea floor 114. The subsea system 104 further includes a wellhead 116 with a tubular 118 extending into a wellbore 120, a BOP 122 and a subsea unit 124. The BOP 122 has a ram assembly 125 with rams 126 for shearing and/or sealing to seal the wellbore 120. The rams 126 each include a BOP seal assembly 130 with a compound BOP seal 132.

The surface system 102 and subsea system 104 may be provided with one or more control units, such as the surface unit 110 and/or the subsea unit 124, located at various locations to control the surface system 102 and/or the subsea systems 104. Communication links 128 may be provided for communication between the units and various parts of the wellsite 100.

The BOP 122 may be coupled to a BOP monitoring system 101 to monitor BOP operations. The BOP monitoring system 101 may be coupled to the BOP 122 and/or other portions of the wellsite 100 and/or offshore locations to collect data, communicate with various locations, measure parameters, analyze results, generate reports and/or adjust operations. The BOP monitoring system 101 may be in communication with the BOP 122, for example, via the units 110, 124 and/or communication links 128.

The BOP monitoring system 101 may be located on or off the wellsite 100. While the BOP monitoring system 101 is depicted as being coupled to the BOP 122 via communication link 128, the BOP monitoring system 101 may be incorporated into one or more of the control units 110, 124, the surface system 102, the downhole system 104, and/or other locations. Sensors may optionally be provided as part of the BOP monitoring system 101 or be coupled thereto for providing information.

Figure 2:
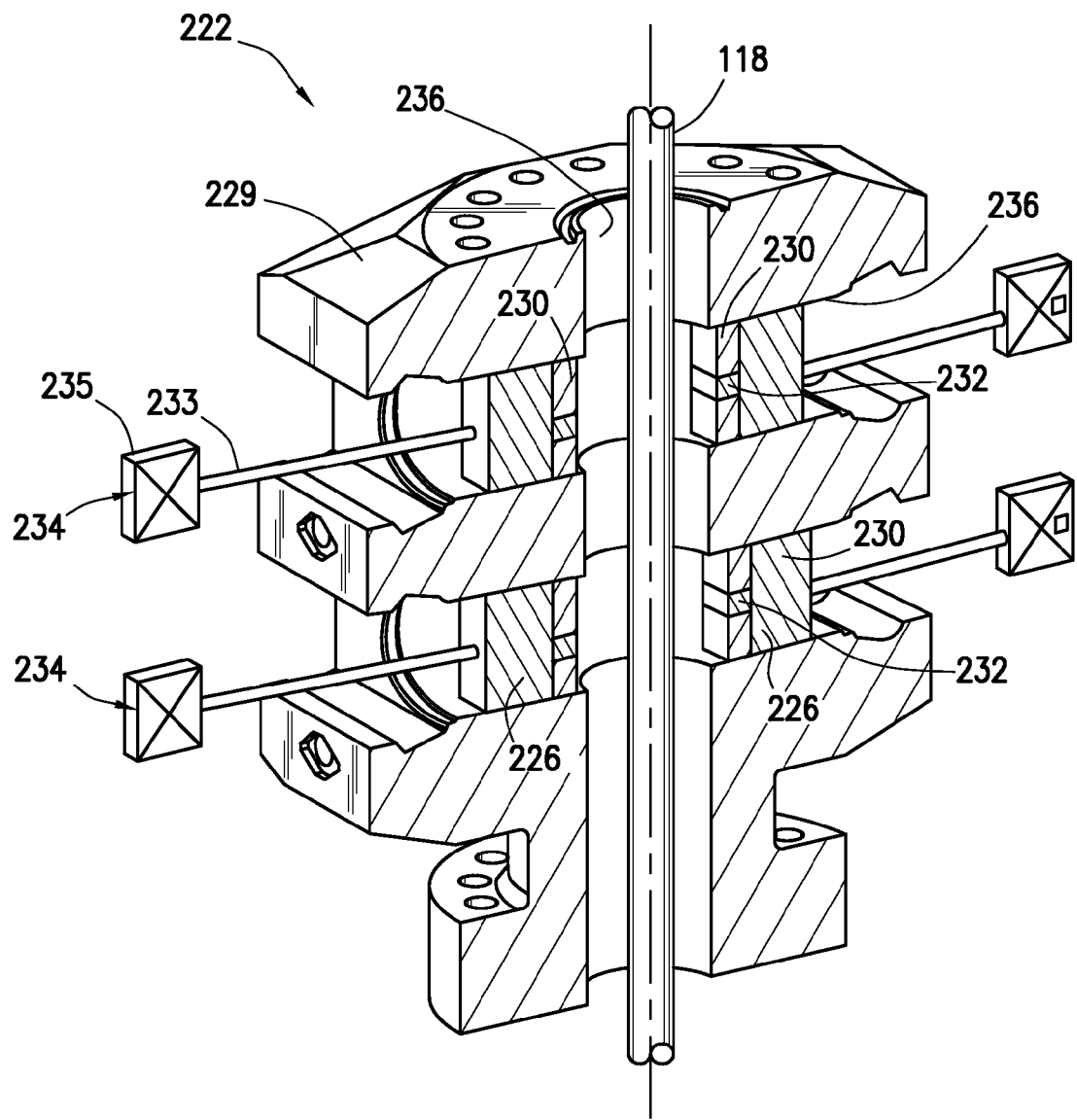
FIG. 2 is a vertical cross-sectional view of a BOP having the BOP seal assemblies with the compound BOP seals.

FIG. 2 depicts an example BOP 222 usable as the BOP 122 of FIG. 1. The BOP 222 includes a housing 229 with multiple rams 226 movably positionable therein by actuators 234. The actuators 234 may include a ram rod 233 and cylinder 235 for selectively extending and retracting the rams 226. The pipe 118 extends through the housing 229. The rams 226 are positionable in passage 236 of the housing 229 and selectively movable into engagement with the pipe 118 for sealing and/or severing the pipe 118. The actuators 234 may be selectively activated by units (e.g., 110, 124 of FIG. 1). The rams 226 may extend for engagement within the BOP 222 with or without contact with the pipe 118 to form a seal about the wellbore.

The rams 226 have BOP seal assemblies 230 with compound BOP seals 232 therein for forming a seal. The BOP seal assemblies 230 and compound BOP seals 232 are carried by the rams 226 and move relative to the pipe 118. The seal assemblies 230 of adjacent rams 226 may converge and move into sealing engagement about the tubular 118.

The seal assemblies 230 may seal with the seal assembly 230 of an adjacent ram and/or with the tubular 118.

Figure 3A:
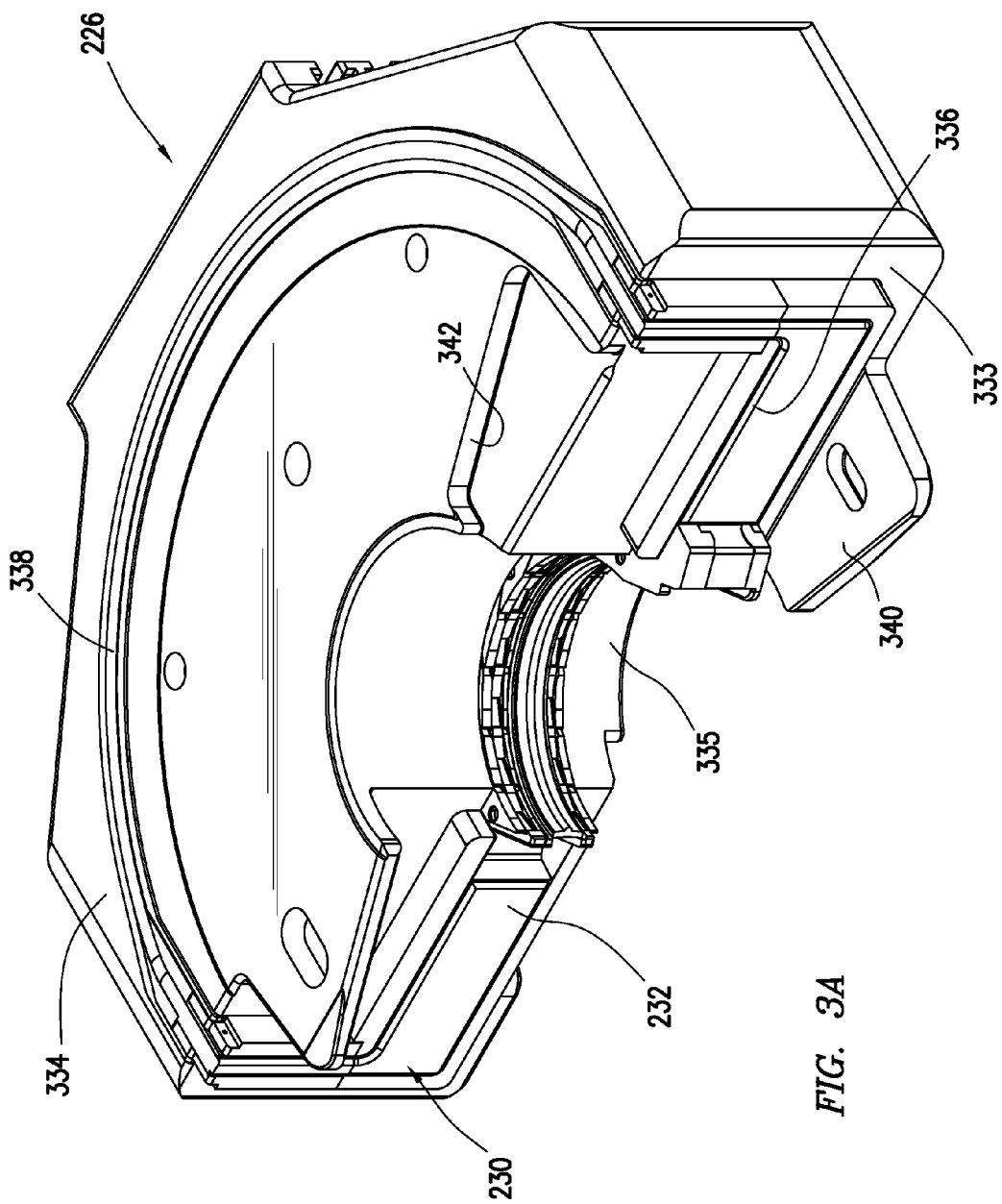
FIGS. 3A and 3B are perspective and exploded views, respectively, of a ram block having the BOP seal assembly with the compound BOP seal.
Figure 3B:
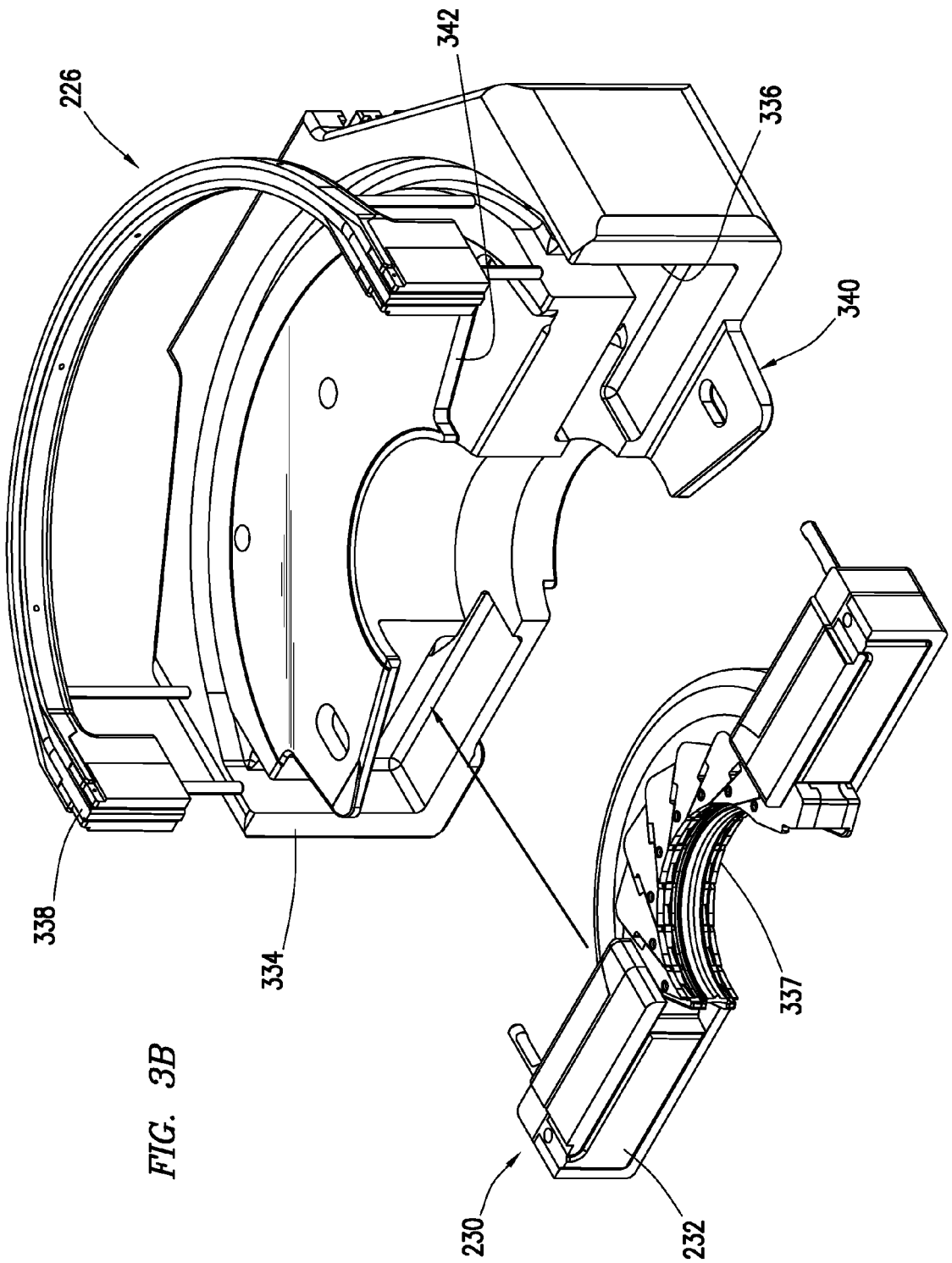

FIGS. 3A and 3B show perspective and exploded views, respectively, of the ram 226 and the BOP seal assembly 230. The ram 226 includes a ram block 334 with a seal cavity 336 to receive the BOP seal assembly 230. The ram 226 also has a sealing face 333 with the seal cavity 336 extending therein, and an inlet 335 shaped to receive the tubular 118. The ram 226 may also include other features, such as a housing seal 338, keys 340, and keyways 342.

The BOP seal assembly 230 includes the compound BOP seal 232. The compound BOP seal 232 has a sealing surface 337 extending along the sealing face 333 and inlet 335 of the ram 226. The sealing surface 337 of the compound BOP seal 232 is sealingly engageable with a compound BOP seal 232 of an adjacent ram and/or with the tubular 118.

Figure 4A:
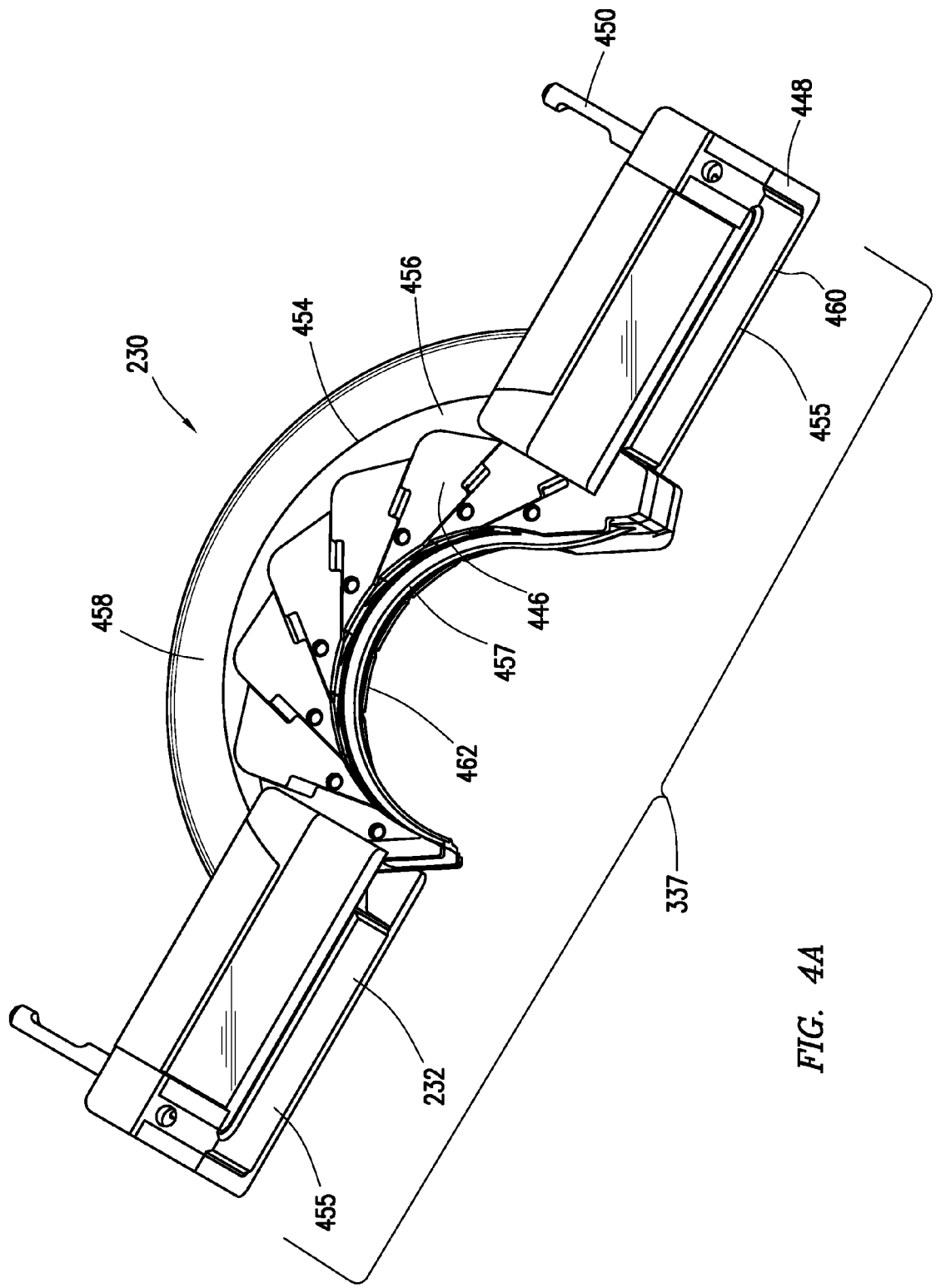
FIGS. 4A and 4B are perspective and exploded views, respectively, of the BOP seal assembly with the compound BOP seal including a face seal and a support seal.
Figure 4B:
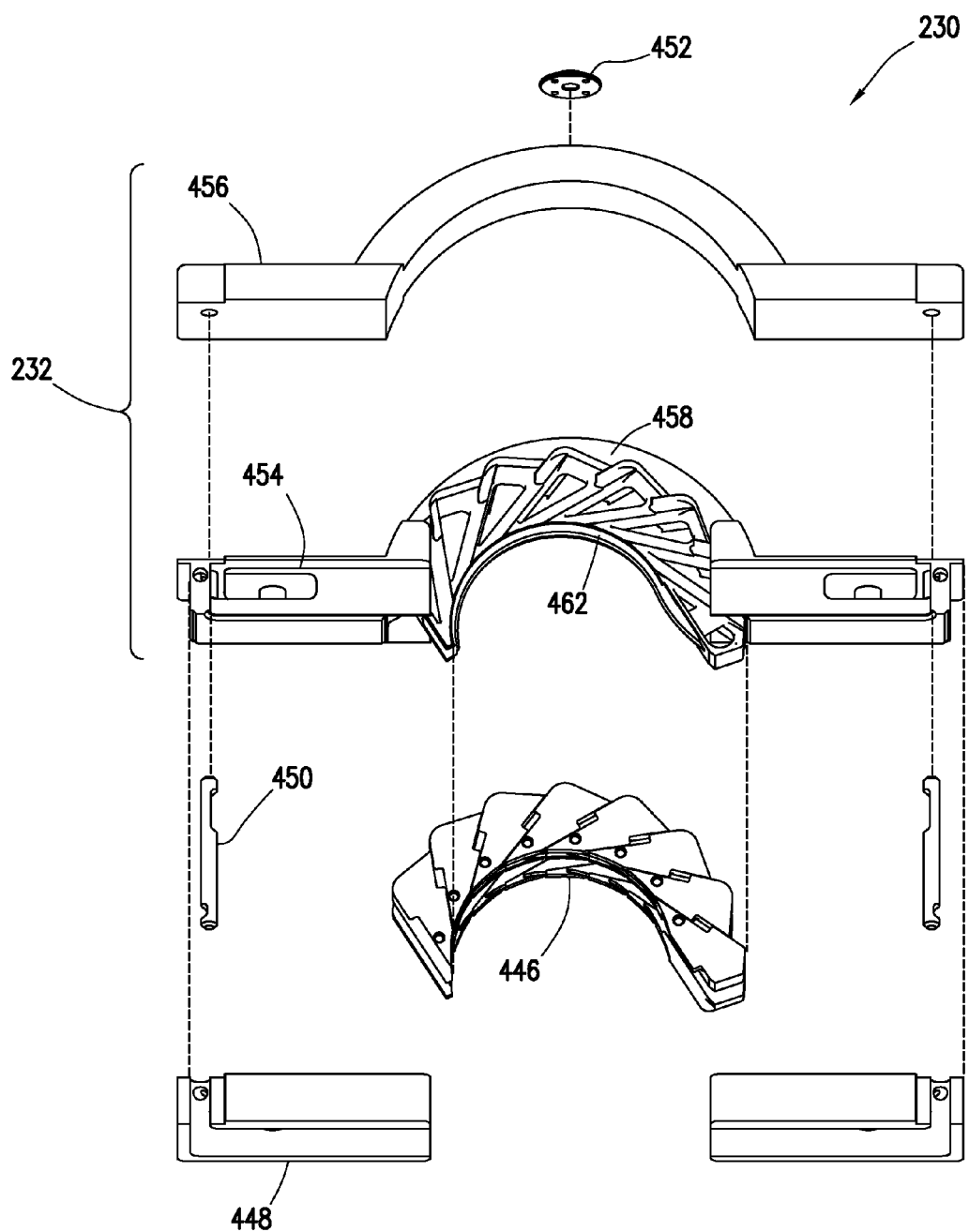
Figure 5A:
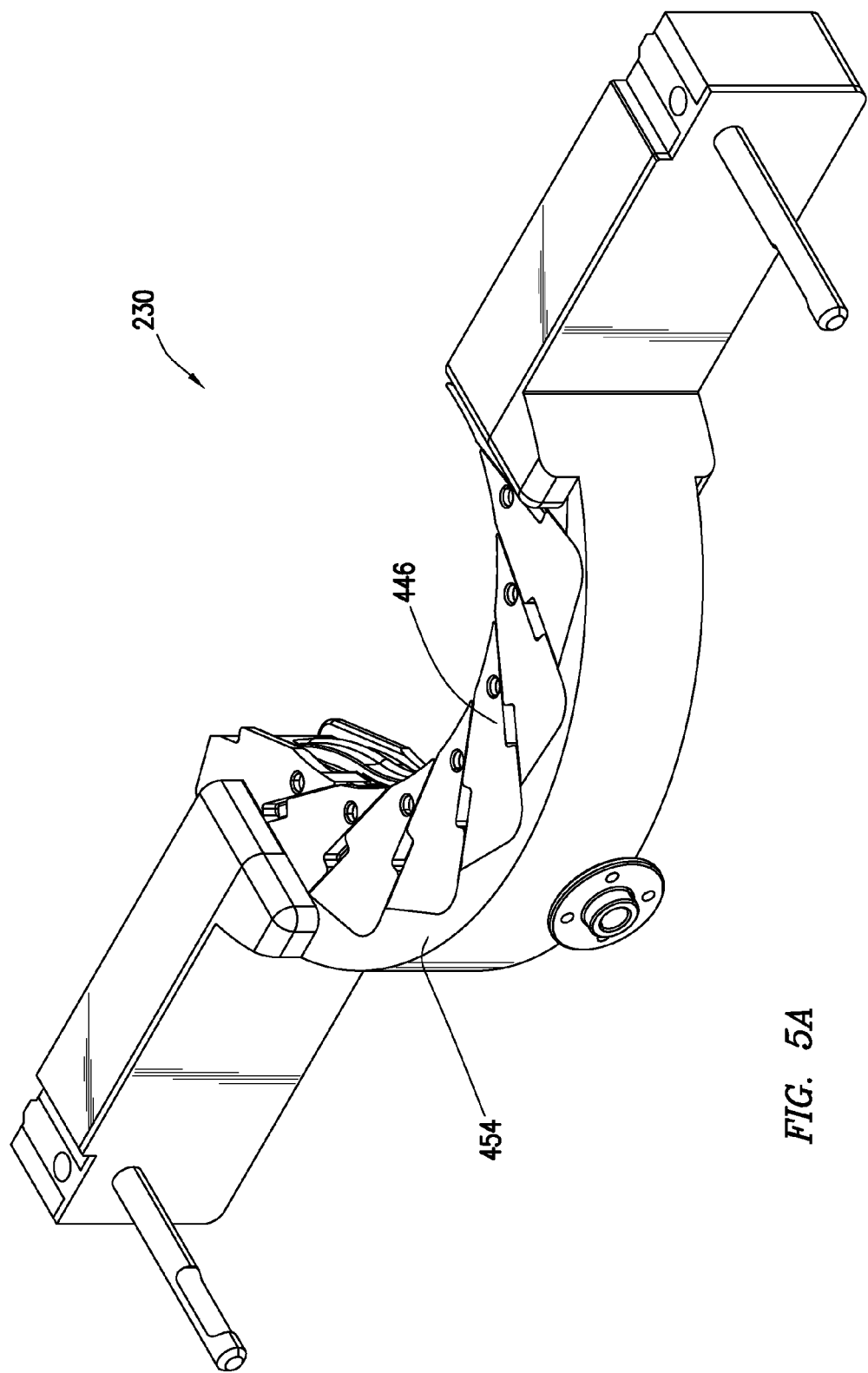
FIGS. 5A and 5B are front and rear perspective views, respectively, of the BOP seal assembly with the support seal removed.
Figure 5B:
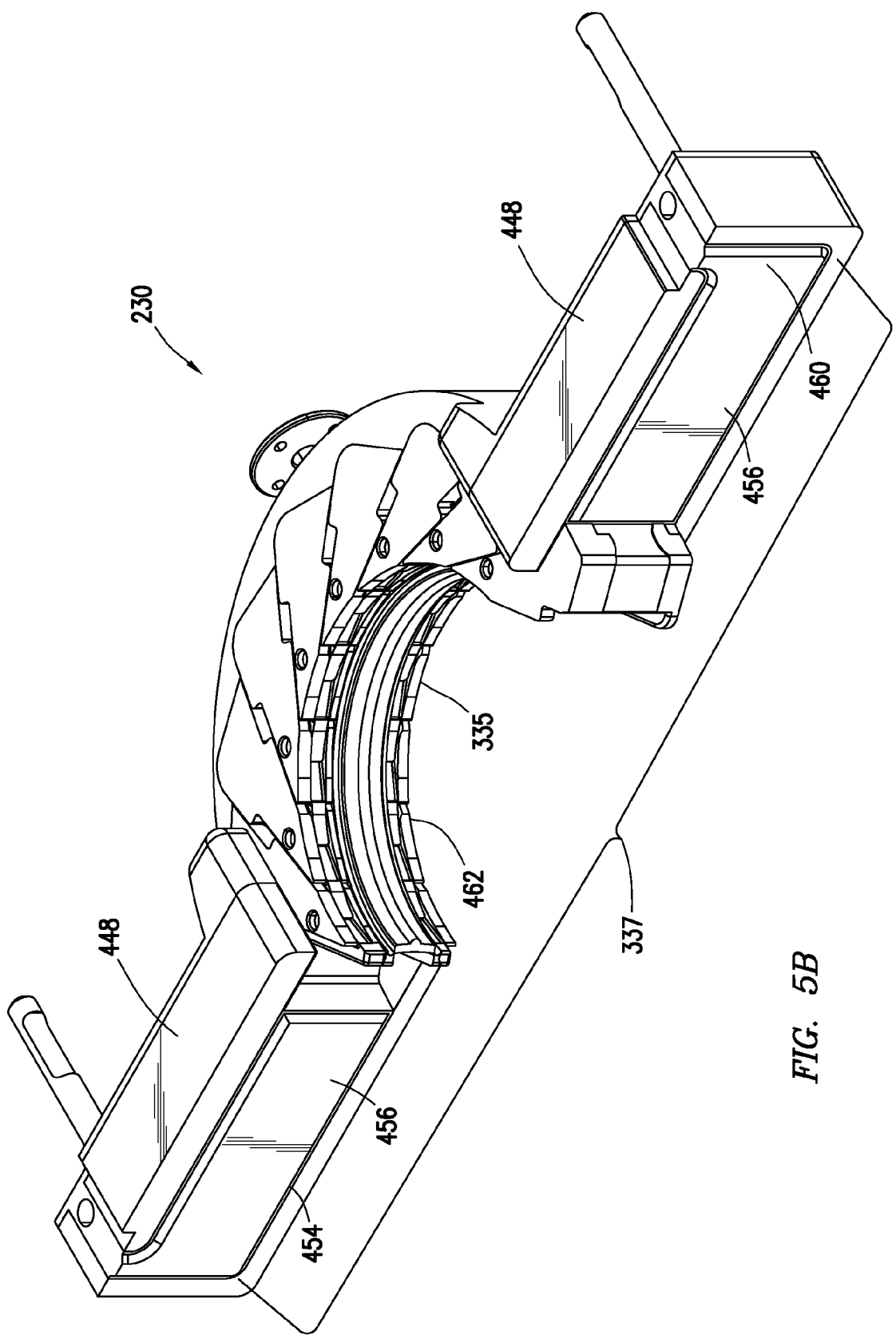

FIGS. 4-5B show various aspects of the BOP seal assembly 230. FIGS. 4A and 4B show perspective and exploded views, respectively, of the BOP seal assembly 230. FIGS. 5A and 5B show front and rear perspective views, respectively, of a portion of the BOP seal assembly 230.

Figure 6A:
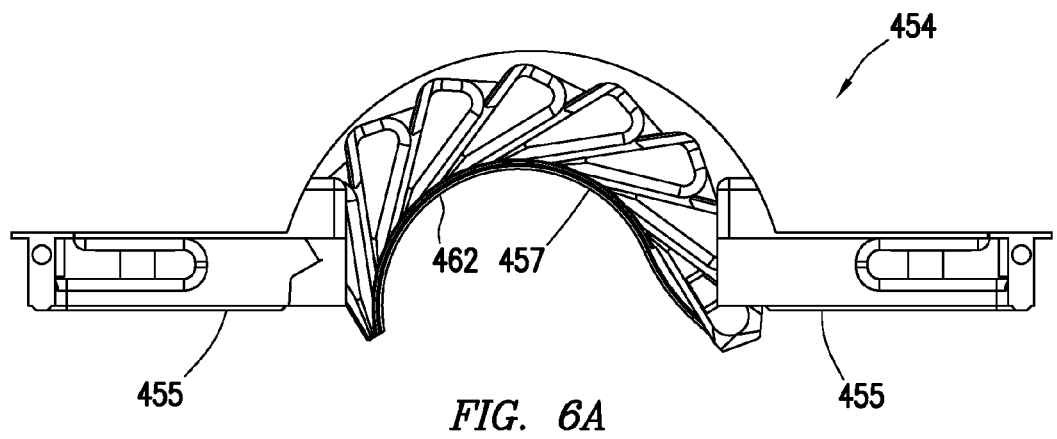
FIGS. 6A-6C are top, front, and rear views, respectively, of the face seal of the compound BOP seal.
Figure 6B:
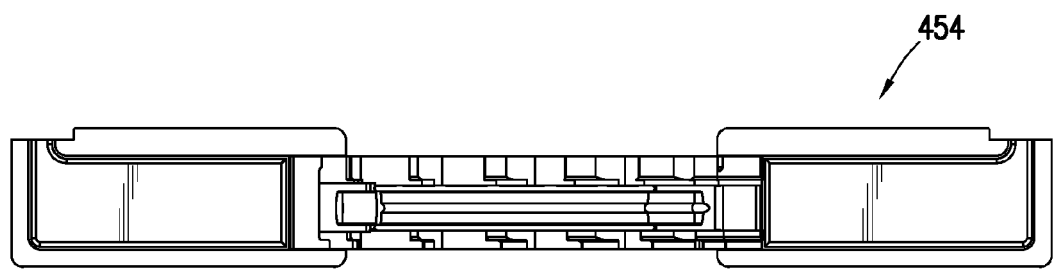
Figure 6C:
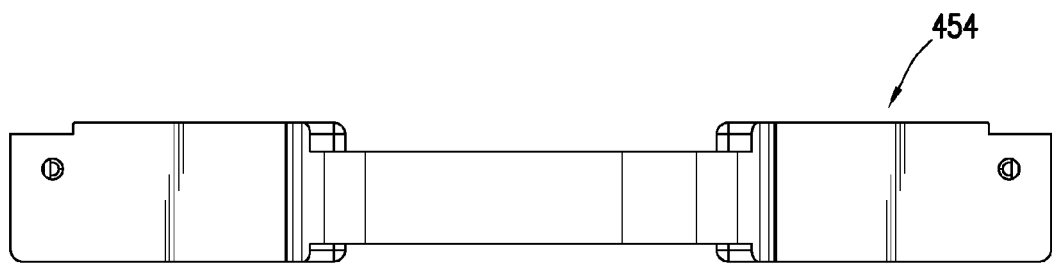
Figure 7A:
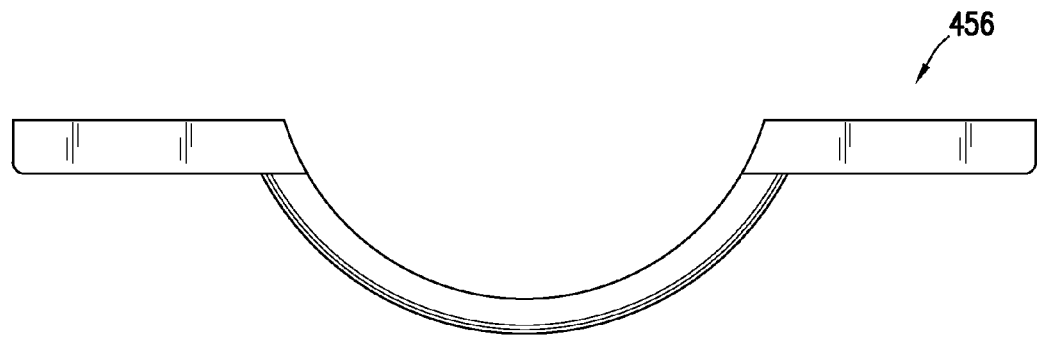
FIGS. 7A-7C are top, front, and rear views, respectively, of a support seal of the compound BOP seal.
Figure 7B:
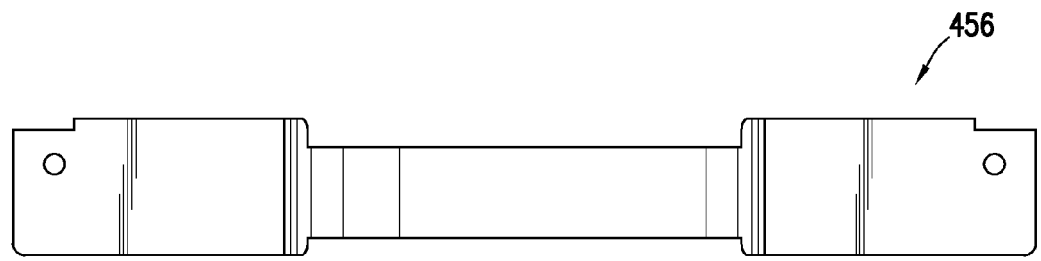
Figure 7C:
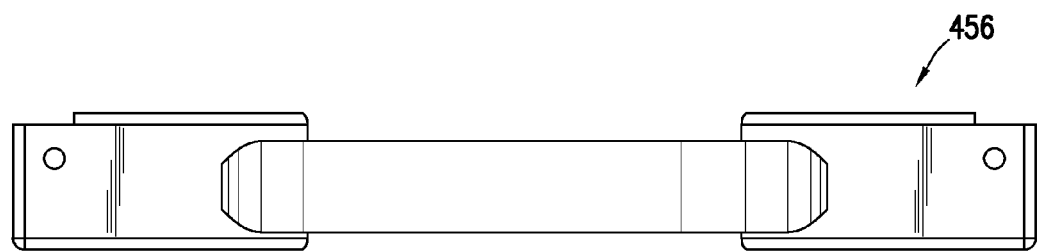

As shown in FIGS. 4A-5B, the BOP seal assembly 230 also includes inserts 446, metal supports 448, lateral pins 450, and retention washer 452. As shown, the compound BOP seal 232 includes a face seal 454 and a support seal 456. FIGS. 6A-6C show additional views of the face seal 454. FIGS. 7A-7C show additional views of the support seal 456. The face seal 454 may be molded together with the inserts 446, supports 448, and pins 450. The support seal 456 is positioned along a rear support surface 458 of the face seal 454 opposite the sealing surface 337 to provide support thereto.

The face seal 454 is depicted as having contact region 455 about the supports 448 and an arcuate region 457 about the inserts 446 (see, e.g., FIG. 5A). The front sealing surface 337 has a lateral bead 460 along each of the linear portions about the supports 448, and a seal bore 462 along the inlet 335. The front sealing surface 337 of face seal 454 is shaped to contact and sealingly engage another surface and/or the tubular 118. The support seal 456 is shaped to support the face seal 454.

As shown in FIGS. 4B and 6A, the face seal 454 may be molded around inserts 446 such that portions of the face seal 454 form holes to receive the inserts 446 therethrough. The seal bore 462 is sandwiched between portions of the inserts 446 such that the seal bore forms a lip deformable against the tubular between portions of the insert 446 above and below the lip.

Referring to FIGS. 4A-5B, the face seal 454 has the front sealing surface 337 positionable in a contact position for sealing with the tubular 118 and/or another BOP seal. The support seal 456 is positionable away from the sealing surface 337 and in a non-contact position relative to the another BOP seal and/or the tubular 118. In this configuration, the face seal 454 provides contact surfaces for sealing engagement, while the support seal 456 is isolated from contact with sealed components. Other configurations may be provided where at least a portion of the support seal 456 engages the sealed components.

The compound BOP seal 232, face seal 454, and/or support seal 456 may be made of one or more materials. The materials may be, for example, an elastomeric material, such as rubber. One or more seals may be used to form the compound BOP seal 232. The face seal 454 may be made of a harder (less deformable) material (e.g., with a higher compressive modulus) with flow sufficient to provide a seal. The support seal 456 may be made of a softer (more deformable) material (e.g., with a lower compressive modulus) with a reduced strength to provide support to the face seal 454 and increase flow thereabout.

In an example, a harder compound may be used with the face seal 454 to resist higher stresses, and a softer compound may be used with the support seal 456 to facilitate actuation of the BOP seal. A softer compound may be used, for example, to increase sealing ranges at low temperatures. A harder compound may be used, for example, to resist wear and/or fatigue. The selected material may also be selected to achieve a desired sealing range at a desired temperature.

Figure 8A:
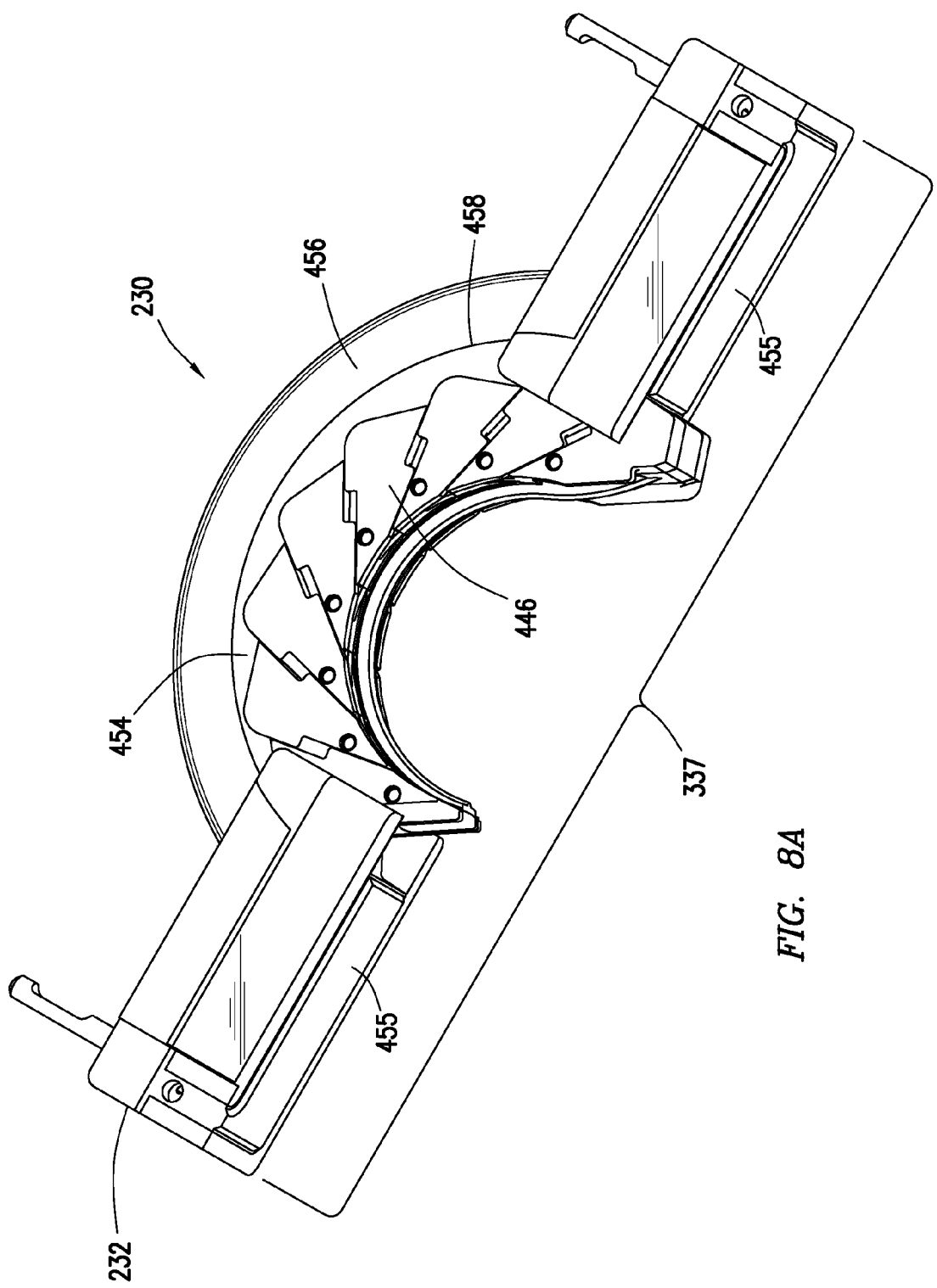
FIGS. 8A and 8B are perspective and top views of the BOP seal assembly in an undeformed and deformed position, respectively.
Figure 8B:
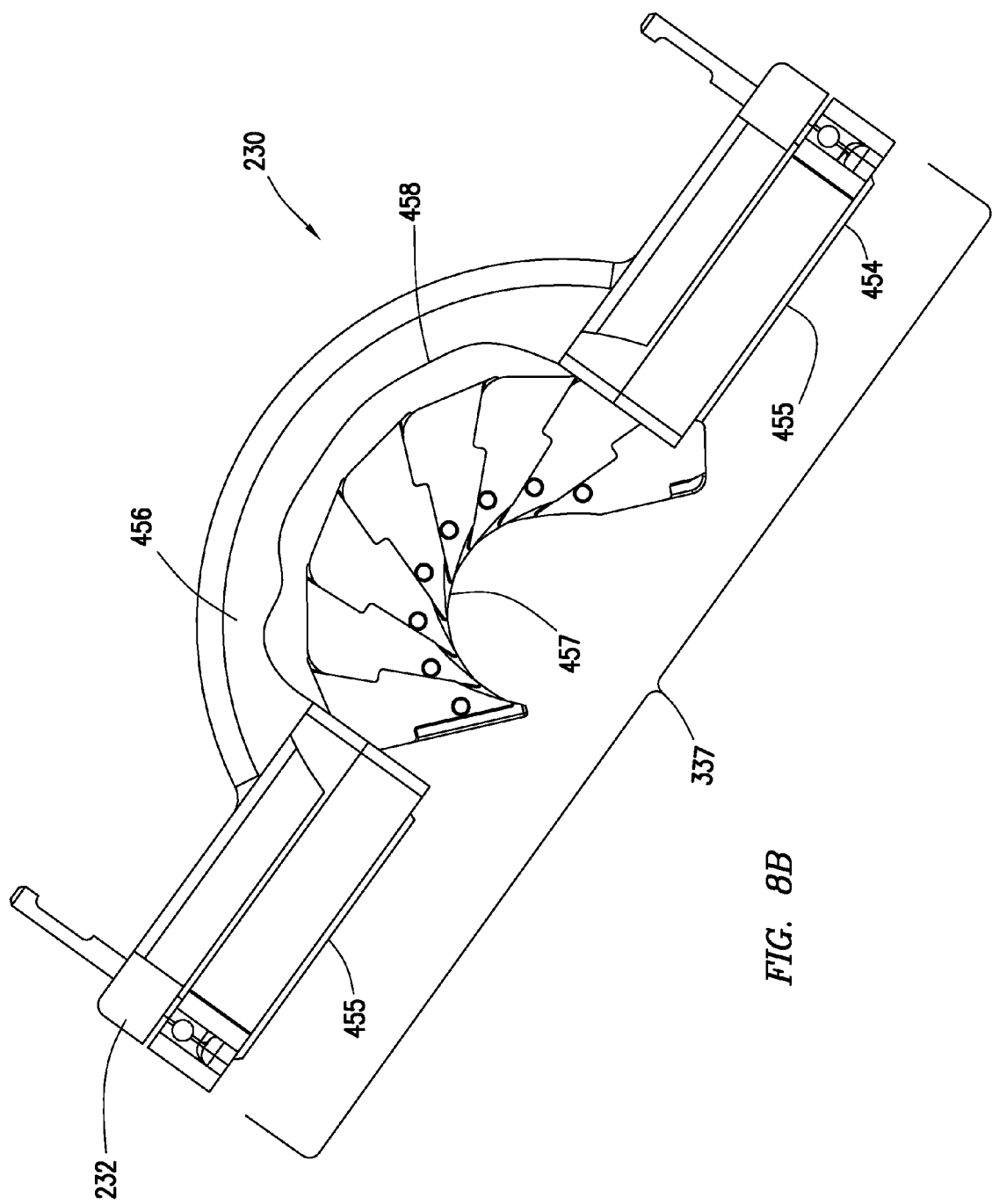
Figure 9:
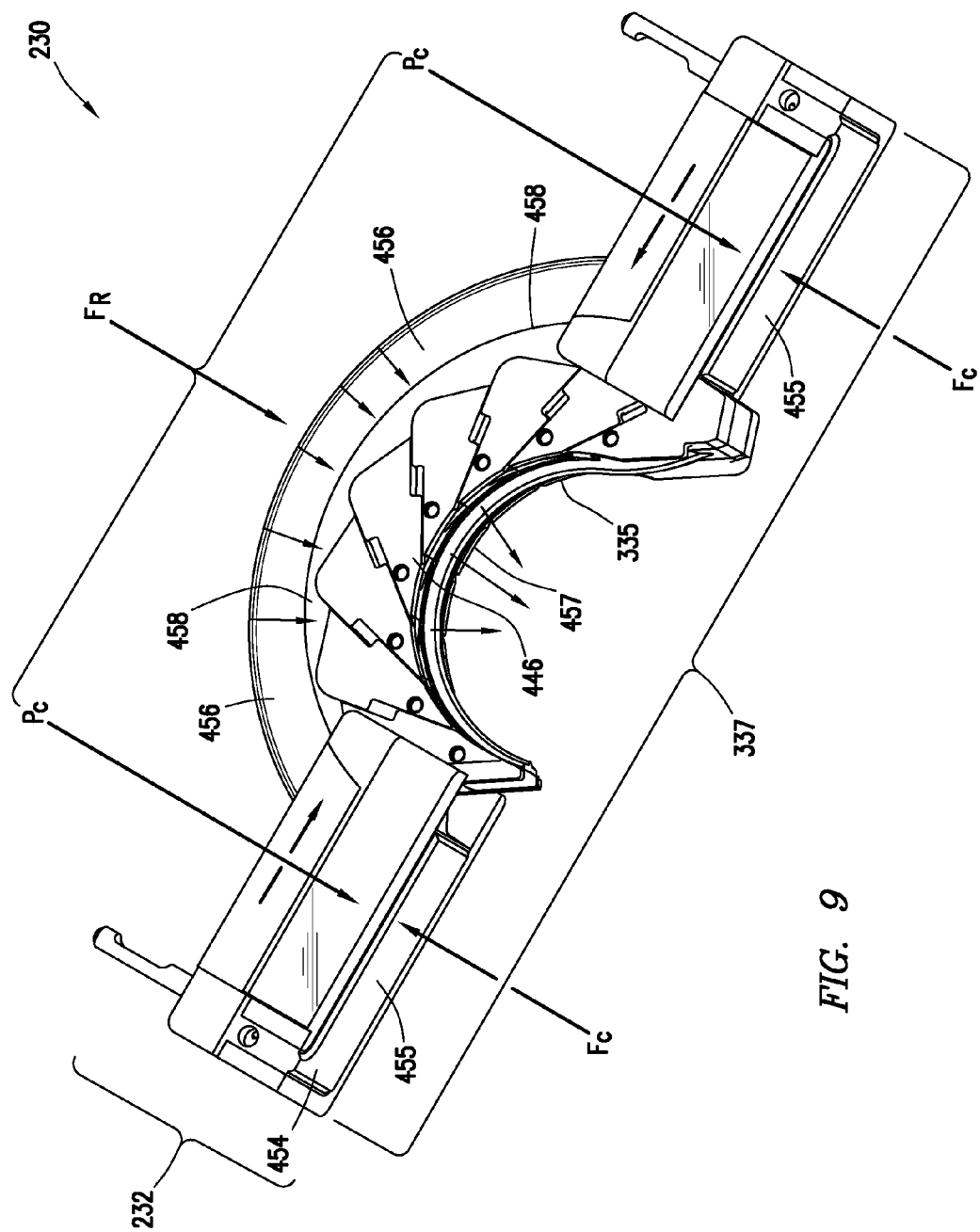
FIG. 9 is a schematic view of the BOP seal assembly showing flow of the compound BOP seal during sealing.

FIGS. 8A-9 depict the BOP seal assembly 230 during operation. FIGS. 8A and 8B show the BOP seal assembly 230 in an undeformed and a deformed position, respectively. FIG. 9 shows compression of the BOP seal assembly 230 during operation of the BOP 222 (FIGS. 1 and 2) and convergence of the rams 226 about the tubular 118 (FIG. 2). As the rams 222 press against an adjacent ram and/or tubular 118, the BOP seal 232 is activated to sealingly engage along sealing surface 337.

During sealing engagement, the face seal 454 makes initial contact along the contact regions 455. The rams 222 continue to advance and moves from the undeformed position of FIG. 8A to the deformed position of FIG. 8B. Under deformation, the compound BOP seal 232 flows and the inserts 446 converge. Contact pressure is transferred through the face seal 454 and to the support seal 456. The face seal 454 has a harder (less deformable) material to support the seal in sealing engagement with sufficient flow to allow the inserts 446 to move and to allow the face seal 454 form a seal.

The face seal 454 may be used, for example, to affect a seal about the wellbore and/or to activate/move the inserts 446 into the deformed position (e.g., pushed against the tubular 118). The face seal 454 may facilitate movement of the inserts 446 to prevent extrusion of the face seal 454 between the inserts 446 and the tubular 118. The inserts 446 may be movable a range of distances to accommodate various wellsite configurations and/or tubular sizes.

The support seal 456 provides flexible support for the face seal 454 along the rear surface 458 thereof. As a softer (more deformable) compound, the support seal 456 flows to provide a flexible support between the face seal 454 and the ram 222. The ram 222 supplies rigid support along a rear surface of the face seal 448. The BOP seal 230 is confined from the front surface by contact with an adjacent ram.

As shown in FIG. 9, the forces apply to the compound BOP seal 232 as the compound BOP seal 232 flows towards inlet 335. As the rams 226 are deformed together, a deformation force $F_C$ is applied along sealing surface 337 and compressive force FR is applied along rear surface 458. The compound BOP seal 232 is confined from the rear to allow the face seal 454 to flow about the inlet 335 in an effort to continue relieving the increasing pressure caused by the force $F_R$ on the ram.

A volume of the face seal 454 flows and is transferred along the contact regions 455 and the arcuate region 457 towards the inlet 335 as indicated by the arrows. The harder rubber of the face seal 454 provides a seal with flexibility which flows to allow movement of the inserts, and the softer rubber of the support seal 456 has sufficient flow to permit flexibility between the face seal 454 and the ram 226 while supporting the face seal 454. The flow displaces a portion of the face seal 454 from the contact region 455 to the arcuate region 457 of the BOP seal assembly 230.

The inserts 446 are displaced with the compound BOP seal 232, and converge about the tubular 118. The inserts 446 and/or face seal 454 may engage the tubular 118. Once in sealing engagement (e.g., in contact with the tubular 118 and/or another BOP seal assembly 230), the face seal 454 becomes hydro-locked and the contact pressure $P_C$ of the ram 222 (generated from the force $F_R$) reaches the desired level to achieve a seal with the compound BOP seal 232.

While a specific configuration of the BOP seal assembly 230 and compound BOP seal 230 are depicted, variations may occur. For example, the compound BOP seal 230 may be made of one or more portions of one or more materials of various geometries.

Figure 10A:
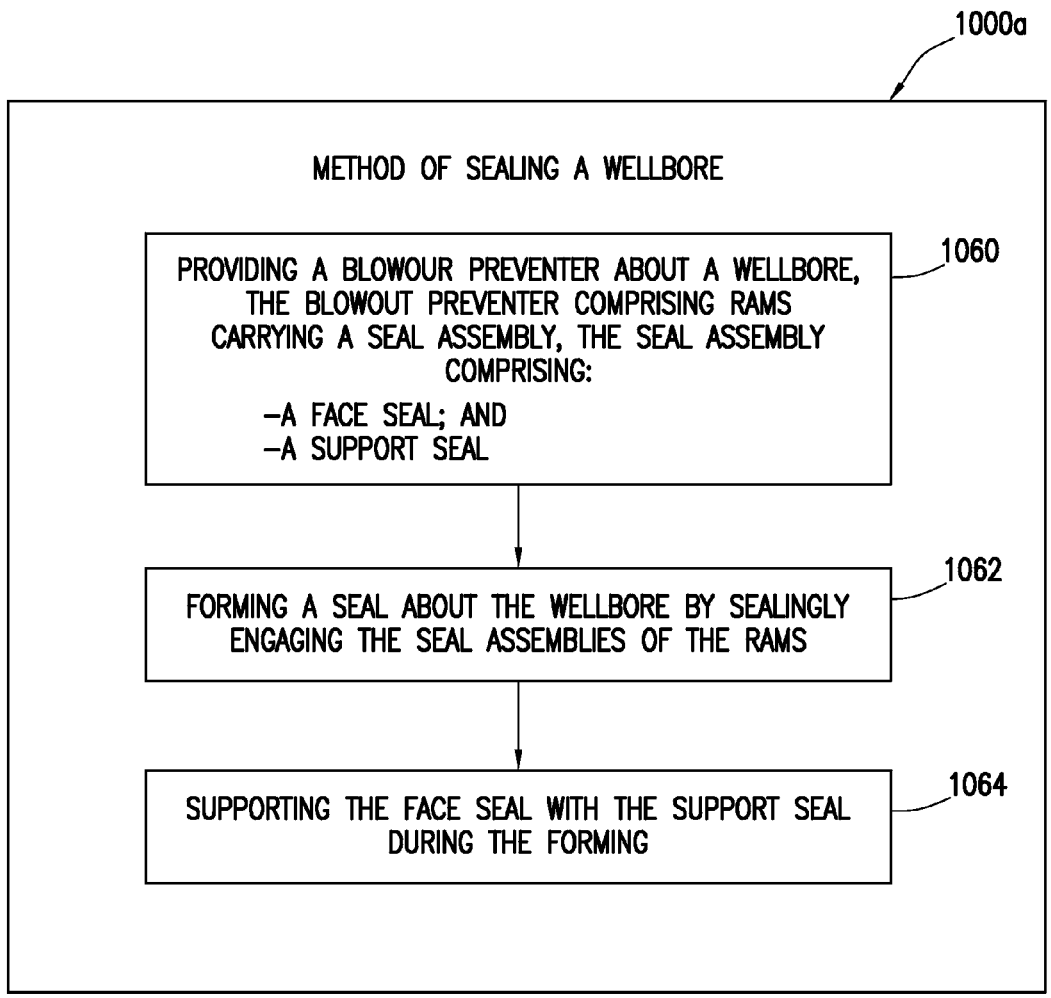
FIGS. 10A and 10B are flow charts depicting methods of sealing a wellbore.

FIG. 10A depicts a method 1000a of sealing a wellbore. The method 1000a involves 1060—providing a blowout preventer about a wellbore. The blowout preventer comprising rams carrying a seal assembly. The seal assembly comprises a face seal and a support seal. The method further involves 1062—forming a seal about the wellbore by sealingly engaging the seal assemblies of the rams, and 1064—supporting the face seal with the support seal during the forming. The methods may be performed in any order, or repeated as desired. Various combinations of the methods may also be provided.

Figure 10B:
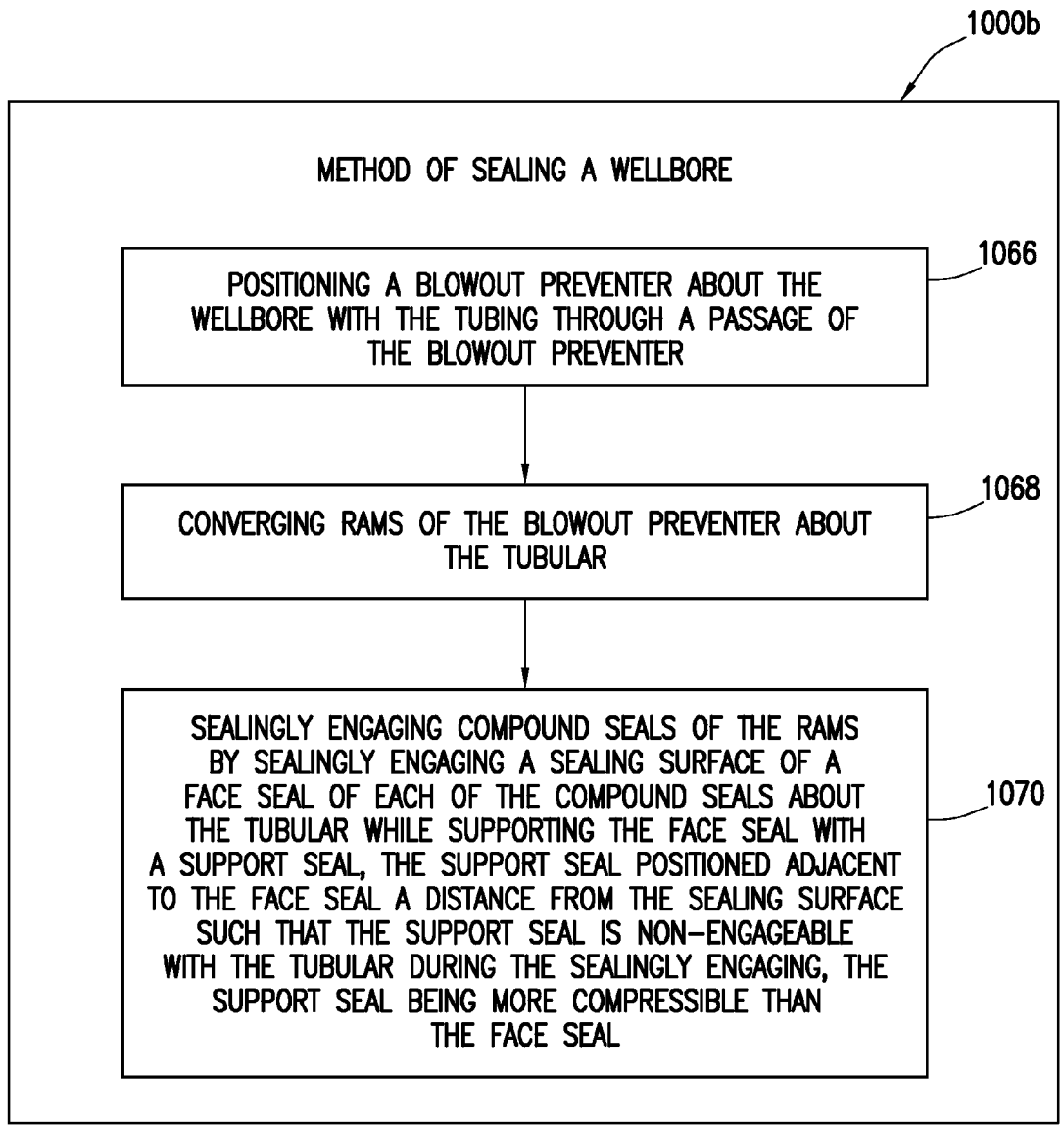

FIG. 10B depicts a method 1000b of sealing a wellbore. The method 1000b involves 1066—positioning a blowout preventer about the wellbore with the tubing through a passage of the blowout preventer. The method further involves 1068—converging rams of the blowout preventer about the tubular, and 1070—sealingly engaging compound seals of the rams by sealingly engaging a sealing surface of a face seal of each of the compound seals about the tubular while supporting the face seal with a support seal positioned adjacent to the face seal a distance from the sealing surface such that the support seal is non-engageable with the tubular, the support seal being more deformable than the face seal. The methods may be performed in any order, or repeated as desired. Various combinations of the methods may also be provided.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, one or more BOP seals (e.g., face and support) of various shapes may be made of various (same or different) materials having various sealing characteristics (e.g., hardness) for achieving the desired sealing capabilities.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

What is claimed is:

1. A seal assembly for a ram of a blowout preventer for sealing a wellbore penetrating a subterranean formation, the wellbore having a tubular to pass fluid therefrom, the ram positionable about the tubular, the seal assembly comprising:
   a compound seal carried by the ram, the compound seal comprising:
      a face seal having a sealing surface sealingly engageable about the tubular, the sealing surface extending along a front face thereof engageable with at least one of the tubular and the face seal of another ram; and
      a support seal positionable adjacent to the face seal a distance from the sealing surface, the support seal non-engageable with the tubular during sealing, the support seal being more deformable than the face seal whereby the compound seal is supported during sealing; and
   inserts supported within the face seal.

2. The seal assembly of claim 1, further comprising an array of the inserts with the face seal molded thereabout.

3. The seal assembly of claim 2, wherein the face seal has a lip extending between upper and lower portions of the array of inserts.

4. The seal assembly of claim 2, further comprising supports on opposite sides of the array of the inserts.

5. The seal assembly of claim 4, wherein the face seal has contact regions positionable about the supports.

6. The seal assembly of claim 5, wherein the contact regions have a flat face along the sealing surface.

7. The seal assembly of claim 1, wherein the face seal has a support surface away from the sealing surface, the support seal positionable along the support surface.

8. The seal assembly of claim 1, wherein both the face seal and the support seal each have a pair of linear portions with an arcuate portion therebetween.

9. The seal assembly of claim 1, wherein the face seal and the support seal each comprise a deformable material.

10. A blowout preventer for sealing a wellbore penetrating a subterranean formation, the wellbore having a tubular to pass fluid from the wellbore, the blowout preventer comprising:
- a housing positionable about the wellbore, the housing having a passage to receive the tubular therethrough;
- rams positionable about the passage; and
- a seal assembly carried by each of the rams, each seal assembly comprising a compound seal comprising:
  - a face seal having a sealing surface sealing engageable about the tubular, the sealing surface extending along a front face thereof engageable with at least one of the tubular and the face seal of another ram; and
  - a support seal positionable adjacent to the face seal a distance from the sealing surface, the support seal non-engageable with the tubular during sealing, the support seal being more deformable than the face seal whereby the compound seal is supported during sealing; and
  - inserts supported within the face seal.

11. The blowout preventer of claim 10, further comprising a housing seal carried by the ram.

12. The blowout preventer of claim 10, wherein each of the rams has a sealing face, the sealing surface of the seal assembly positioned about the sealing face.

13. The blowout preventer of claim 10, wherein each of the rams has a seal cavity therein, the seal assembly receivable in the seal cavity.

14. The blowout preventer of claim 10, wherein each of the rams has a seal cavity extending into a sealing face thereof, the seal assembly receivable in the seal cavity such that the sealing surface is positioned about the sealing face.

15. The blowout preventer of claim 10, wherein each of the rams has at least one key and at least one keyway about a sealing face thereof, the at least one key and at least one keyway interlockingly engageable with a corresponding at least one key and at least one keyway of an adjacent ram.

16. The blowout preventer of claim 10, further comprising an actuator to selectively extend and retract the rams.

17. A method of sealing a wellbore penetrating a subterranean formation, the wellbore having a tubular to pass fluid from the wellbore, the method comprising:
- positioning a blowout preventer about the wellbore with the tubular through a passage of the blowout preventer;
- converging rams of the blowout preventer about the tubular; and
- sealingly engaging compound seals of the rams by sealingly engaging a sealing surface of a face seal of each of the compound seals about the tubular while supporting the face seal with a support seal, the sealing surface extending along a front face thereof engageable with at least one of the tubular and the face seal of another ram, the support seal positioned adjacent to the face seal a distance from the sealing surface such that the support seal is non-engageable with the tubular during the sealingly engaging, the support seal being more deformable than the face seal, and inserts supported within the face seal.

18. The method of claim 17, further comprising supporting an array of the inserts with the face seal.

19. The method of claim 18, wherein the sealingly engaging comprises advancing the array of inserts toward the tubular with the compound seal.

20. The method of claim 18, wherein the sealingly engaging comprises flowing material of the compound seal towards the array of inserts.

21. The method of claim 17, wherein the sealingly engaging comprises flowing contact regions of the compound seal towards an arcuate region of the compound seal between the contact regions.

22. The method of claim 21, wherein the sealingly engaging comprises flowing material of the arcuate region of the compound seal towards the tubular.

23. The method of claim 17, wherein the sealingly engaging comprises flowing material of the compound seal along the sealing surface.

24. The method of claim 17, wherein the converging comprises advancing the rams towards the tubular.

25. The method of claim 24, wherein the sealingly engaging comprises deforming the compound seal with the rams.

26. The method of claim 25, wherein the sealingly engaging comprises deforming the face seal against the tubular and deforming the face seal with the support seal.

27. The method of claim 25, wherein the sealingly engaging comprises deforming the face seal against the face seal of the another ram.

* * * * *